Figure 1:
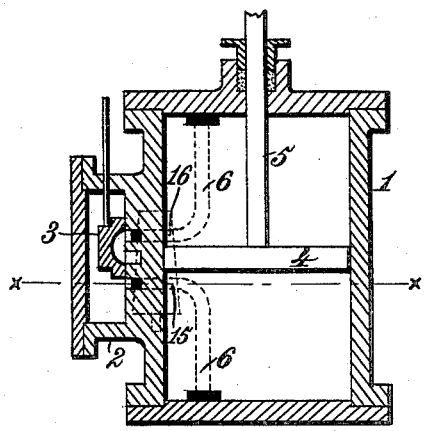

(No Model.) 2 Sheets—Sheet 1.

R. W. MEWES.
VALVE FOR REVERSING ENGINES.

No. 456,832. Patented July 28, 1891.

Witnesses:
Robert Evritt
Dennis Sumby

Inventor:
Richard W. Mewes.
By James L. Norris
Atty (No Model.)
R. W. MEWES.
VALVE FOR REVERSING ENGINES.
No. 456,832. Patented July 28, 1891.
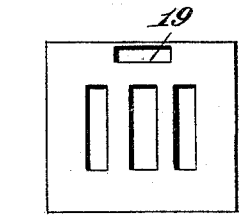
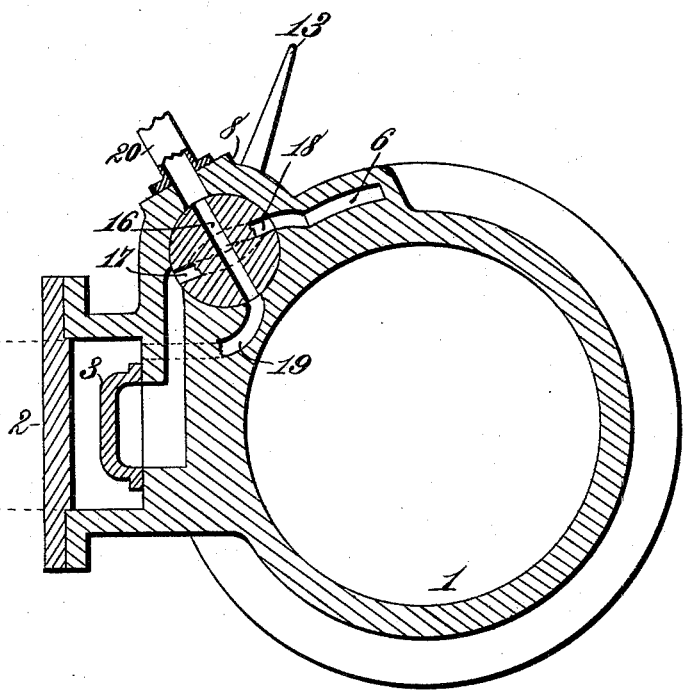
Witnesses.
Robert Everett.
Dennis Dumby.
Inventor.
Richard W. Mewes.
By
James L. Norris.
Atty.

UNITED STATES PATENT OFFICE.

RICHARD WATSON MEWES, OF NEWCASTLE-UPON-TYNE, ENGLAND.

VALVE FOR REVERSING ENGINES.

SPECIFICATION forming part of Letters Patent No. 456,832, dated July 28, 1891.

Application filed March 19, 1891. Serial No. 385,664. (No model.) Patented in England August 22, 1888, No. 12,104.

*To all whom it may concern:*

Be it known that I, RICHARD WATSON MEWES, a subject of the Queen of Great Britain, residing at 104 Shields Road, Byker, Newcastle-upon-Tyne, England, have invented new and useful Improvements in Valves for Reversing Engines, (for which I have obtained a patent in Great Britain, No. 12,104, dated August 22, 1888,) of which the following is a specification.

This invention relates to that type of oscillating reversing-valves for engines which are interposed between the slide-valve and the cylinder-ports in such manner that the course of the steam can be changed for reversing the motion of the engine. An oscillating cylindrical valve has heretofore been employed for the purpose stated, such valve being located at right angles to the bore of the cylinder and having a pair of transverse ports at each end, one pair serving for the forward motion and the other pair for the backward motion of the engine. In such construction the entire strain is confined to the end of the oscillating valve containing the two transverse ports which are employed for the admission and emission of steam, and, further, where both pairs of ports extend transversely through the valve-plug the latter must be located transverse to the line of motion and the cylinder-ports must be increased in depth where they join the valve-ports to compensate for the decreased widths which result from forming a pair of the ports transversely through each end of the valve-plug. This strain at one end only of the valve is objectionable in that it destroys the equilibrity and correct working of the valve, besides causing undue wear incident to excessive friction or binding, while the increased depth of the cylinder-ports exposes a large amount of the valve-face to the action of the live and exhaust steam, thereby seriously affecting the truly-turned face of the valve, which materially curtails the life thereof. Furthermore, in a reversing-valve plug of the character mentioned the valve-ports cannot be employed for the admission of steam to the steam-chest if such be desirable, while the reversing-valve being a true cylinder, as heretofore constructed, will soon become inefficient by reason of the impossibility of compensating for the wear of its cylindrical face.

The objects of my invention are to avoid the objections alluded to; to provide a novel construction of reversing-valve plug, whereby its axis of oscillation is in a plane parallel with the bore of the piston-cylinder; to provide a novel arrangement of valve-ports in a reversing-valve plug by which the valve is equilibrated in its positions of adjustment for running the engine forward or backward; to provide for equally distributing the steam-pressure and strain throughout the length of the reversing-valve plug; to provide such a construction of oscillating reversing-valve that undue exposure of the valve-face to the live and exhaust steam is avoided; to provide a reversing-valve plug wherein the two ports for the backward motion of the engine run longitudinally and enter at the side of one end of the plug and reappear at the opposite side of the other end, while the two transverse ports for the forward motion are located, respectively, at opposite end portions of the plug, thereby utilizing the valve as a whole for either the backward or forward motion of the engine, and, finally, to automatically compensate for the wear of the reversing-valve and to adapt the latter to be utilized for the admission of steam to the steam-chest, if desired.

To accomplish all these objects my invention involves the features of construction, the combination or arrangement of devices, and the principles of operation hereinafter described and claimed, reference being made to the accompanying drawings, in which—

Figure 3:
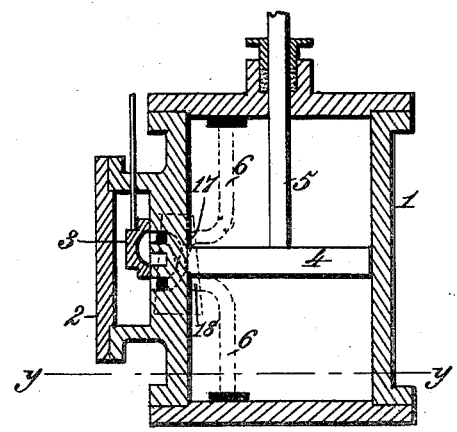
Figure 2:
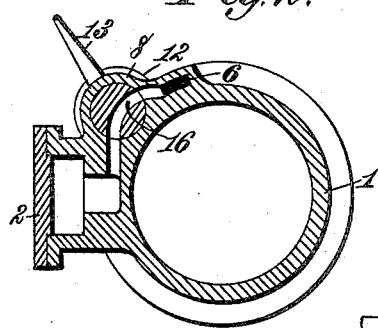
Figure 4:
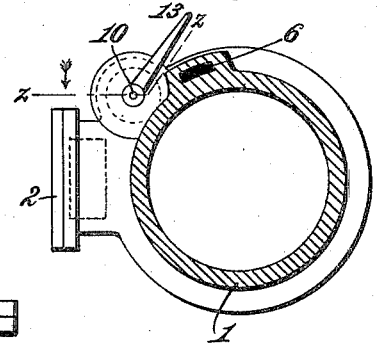
Figure 5:
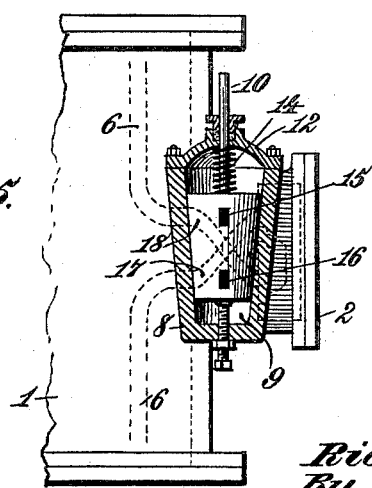

Figure 1 is a longitudinal sectional view of a piston-cylinder and steam-chest, showing the reversing-valve by dotted lines as adjusted to give the forward motion. Fig. 2 is a transverse sectional view taken on the line *x x*, Fig. 1. Fig. 3 is a longitudinal sectional view showing the reversing-valve by dotted lines as adjusted to give the backward motion. Fig. 4 is a transverse sectional view taken on the line *y y*, Fig. 3. Fig. 5 is a sectional view taken on the line *z z*, Fig. 4. Fig. 6 is a transverse sectional view showing the valve adapted for the admission of steam to the steam-chest, from whence it passes to the cylinder; and Fig. 7 is a detail plan view showing the ports in the steam-chest which are governed by the slide-valve.

In order to enable those skilled in the art to make and use my invention, I will now describe the same in detail, referring to the drawings, wherein—

The numeral 1 indicates the cylinder, 2 the steam-chest, 3 the slide or other steam-valve, 4 the piston, 5 the piston-rod, and 6 the cylinder-ports, of a non-expansive engine, such as is employed for steering, hoisting, and similar purposes. The cylinder is formed integral or otherwise, provided with a lateral reversing-valve chest or housing 8, internally tapered, as at 9, and extending longitudinally of the cylinder, with the axis of the latter and of the reversing-valve chest or housing parallel to each other. The cylinder-ports connect with the housing, and in the latter is arranged a conical reversing-valve plug 7, conforming accurately to the tapering interior of such housing and adapted to oscillate or turn axially in a line parallel with the axis of the cylinder-bore in which the piston reciprocates. The valve-rod 10, rigidly secured to the reversing-valve plug, extends through the detachable head or cap 12 of the reversing-valve chest and connects with a lever 13 adapted to be operated by the engineer either directly or through the medium of any proper connecting mechanism. The conical valve-plug is acted upon by a spiral or other spring 14, interposed between the largest end of the plug and the head or cap 12, to maintain the valve accurately in its tapered seat and automatically compensate for wear of the truly-turned valve-face.

The two ports 15 and 16 for the forward motion of the engine are placed, respectively, at the end portions of the valve-plug and extend transversely therethrough substantially parallel to each other. The two ports 17 and 18 for the backward motion of the engine extend longitudinally of the valve-plug and cross each other at a point midway between the forward-motion ports 15. The backward-motion port 17 enters at the side of one end of the plug, runs diagonally along the length of the valve-plug, and reappears at the opposite side of the other end of the valve-plug. The backward-motion port 18 enters the side of the valve-plug directly opposite where the port 17 begins, and such port 18 runs diagonally and reappears at the side of the valve-plug directly opposite where the port 17 reappears at the point explained with reference to the latter port. By this peculiar construction and arrangement the reversing-valve can be so placed that its axis of oscillation is parallel to the axis of the piston-cylinder. If the valve-plug occupies the position shown in Figs. 1 and 2, the motion of the engine will be forward, and to reverse the valve it is axially turned one-quarter of a revolution to place the longitudinal crossing-ports in communication with the valve-chest and cylinder, as in Figs. 3 and 5, whereby the steam is diverted into the opposite end of the cylinder to which the transverse parallel ports divert the steam, hence causing a direct reverse motion. In either adjustment of the reversing-valve it is utilized substantially as a whole for the admission and emission of the working fluid; or, in other words, the live steam passes in at one end and the exhaust passes out at the opposite end, whereby the valve is equilibrated, and neither end solely bears the strain or pressure at any time. This construction largely increases the life of the valve by avoiding undue friction and wear at any one point, and further provides for the cylinder and valve-ports being co-ordinate where they connect with each other, in consequence of which the truly-turned face of the valve is not exposed to the action of the steam traversing such ports during the operation of the parts. If the engine is working with the steam full on for the forward motion, the reversing-valve lever stands at or about an angle of forty-five from the perpendicular, and for the backward motion such lever stands at a similar angle on the opposite side of the perpendicular. If the steam is shut off, the lever stands plumb, and in this position the ports are all covered, thereby forming a steam-cushion at each side of the piston to lock the piston, which is useful in hoisting apparatus, in that it is possible to dispense with the usual foot-brakes, or if the latter be used they are materially assisted. For a duplex engine the valve-ports will be duplicated, as will be obvious.

The reversing-valve constructed as described can be utilized for the admission of steam to the steam-chest, by which it will be understood that when the steam is advisably kept from the steam-chest it can be made to flow through the forward-motion ports to the steam-chest when the engine is running backward and through the backward-motion ports when the engine is running forward, thereby utilizing all the ports. This is exhibited by Fig. 6, where the cylinder is provided with a port 19 and the valve-chest 8 is provided with a steam-conduit 20. If the lever 13 be set, as in Fig. 6, for the backward motion of the engine, the transverse ports supply steam to the steam-chest. If the lever 13 be moved to the opposite position for the forward motion of the engine, the crossing-ports will supply steam to the steam-chest. If the lever 13 be moved to the intermediate position, the steam is shut off from the steam-chest.

Having thus described my invention, what I claim is—

1. The combination, with the piston-cylinder, the steam valve-chest and the cylinder-ports of an engine, of an independent reversing-valve chest on the cylinder and an axially-rotating reversing-valve plug arranged in the independent reversing-valve chest, having its axis of rotation substantially parallel with the longitudinal axis of the cylinder-bore and provided with two transverse forward-motion ports located at opposite end portions of the valve and with two backward-motion ports running longitudinally of the valve and crossing intermediate the forward-motion ports, substantially as described.

2. The combination, with the piston-cylinder having a longitudinal reversing-valve chest internally tapered, the steam-valve chest, and the cylinder-ports, of a conical reversing-valve pressed lengthwise by a spring having its axis of motion substantially parallel with the cylinder-bore and provided with two transverse forward-motion ports located at opposite end portions of the valve and with two backward-motion ports running longitudinally of the valve and crossing intermediate the forward-motion ports, substantially as described.

In testimony whereof I have affixed my signature in presence of two witnesses.

RICHARD WATSON MEWES.

Witnesses:
JOSHUA HETHERINGTON,
JAMES HARDY.